United States Patent [19]

Ding et al.

[11] Patent Number: 5,838,787
[45] Date of Patent: Nov. 17, 1998

[54] METHOD AND SYSTEM FOR CONTROLLING ECHO RETURN LOSS USING A COMPLEMENTARY VARIOLOSSES IN TRANSMIT PATH

[75] Inventors: Heping Ding, Kanata; Scott McClennon, Ottawa, both of Canada

[73] Assignee: Northern Telecom Limited, Montreal, Canada

[21] Appl. No.: 669,712

[22] Filed: Jun. 27, 1996

[51] Int. Cl.⁶ .................................................. H04M 9/08
[52] U.S. Cl. ........................... 379/409; 379/390; 379/420
[58] Field of Search .................................... 379/388, 390, 379/389, 391, 410, 411, 420, 409

[56] References Cited

U.S. PATENT DOCUMENTS

| | | | |
|---|---|---|---|
| 4,700,382 | 10/1987 | Means et al. | 379/390 |
| 4,764,954 | 8/1988 | Tsurusaki et al. | 379/390 |
| 4,879,745 | 11/1989 | Arbel | 379/389 |
| 4,887,288 | 12/1989 | Erving | 379/389 |
| 4,955,055 | 9/1990 | Fujisaki et al. | 379/390 |
| 4,959,857 | 9/1990 | Erving et al. | 379/390 |
| 5,048,082 | 9/1991 | Krafft | 379/409 |
| 5,054,061 | 10/1991 | Yoshida | 379/390 |
| 5,058,153 | 10/1991 | Carew et al. | 379/390 |
| 5,212,722 | 5/1993 | Murata | 379/390 |
| 5,343,521 | 8/1994 | Jullien et al. | 379/409 |
| 5,471,528 | 11/1995 | Reesor | 379/389 |
| 5,579,389 | 11/1996 | Wagner et al. | 379/409 |
| 5,612,996 | 3/1997 | Li | 379/390 |
| 5,668,871 | 9/1997 | Urbanski | 379/409 |
| 5,687,229 | 11/1997 | Sih | 379/410 |
| 5,696,821 | 12/1997 | Urbanski | 379/409 |
| 5,721,771 | 2/1998 | Higuchi et al. | 379/409 |

*Primary Examiner*—Scott Wolinsky

[57] ABSTRACT

A telephone terminal having handsfree functionality is provided with an audio system which controls echo return loss while permitting virtual full-duplex operation. The system, which has a variolosser in both the transmit and receive path and an acoustic echo canceller, also has a complementary variolosser which introduces additional echo return loss only when required and as a function of the state of the system.

6 Claims, 2 Drawing Sheets

METHOD AND SYSTEM FOR CONTROLLING ECHO RETURN LOSS USING A COMPLEMENTARY VARIOLOSSES IN TRANSMIT PATH

FIELD OF THE INVENTION

This invention relates to telephone terminals with handsfree functionality and to a system of introducing non-constant echo return loss to such terminals for virtual full duplex effect.

BACKGROUND OF THE INVENTION

Telephone terminals equipped with handsfree or loudspeaker mode of operation are known to suffer from echo effects. The echo is due to a portion of the received audio signal from the loudspeaker being picked up by the terminal's microphone and re-transmitted to the far end. Such echo return, if not prevented, can be very annoying to users of the telephone network. Without any echo control, the echo can be many times larger than the handsfree user's speech signal.

PRIOR ART

One solution to the echo problem is to incorporate voice activated switched losses (SWL) into both the transmit voice path and receive voice path. These losses, which are introduced by level controlled devices such as variolossers serve to attenuate the amplitude of both the incoming or receive signal and the outgoing or transmit signal in order to reduce the echo to an acceptable level, which meets an echo return loss (ERL) target, namely, ERLT1. ERLT1 is constant and high enough to guarantee an acceptably low echo level at the far end under all signal conditions in both receive and transmit directions. In such a system the amount of each loss provided by the receive variolosser (RxV) and the transmit variolosser (TxV) is controlled by the system's digital signal processor (DSP) responsive to a voice activated switch. As a result of ERLT1, the total amount of the loss is constant, meaning that as the loss provided by the receive variolosser increases, the loss provided by the transmit variolosser is decreased by an equal amount. To meet the ERL target ERLT1, the total loss due to the RxV and TxV needs to be high which results in the system being only half-duplex, i.e., any party on the connection cannot hear and be heard at the same time.

As an alternate to the RxV and TxV losses it is known to employ acoustic echo cancellers (AECs). in the audio system. The AEC, again controlled by the DSP, makes an estimate of the echo on the receive path and subtracts that amount from the transmit path.

An acoustic echo canceller, on its own, is unable to provide sufficient reduction of the echo signal to meet ERLT1 over all network conditions.

It is also known to incorporate both receive and transmit variolossers in conjunction with an acoustic echo canceller in order to meet the echo return loss target ERLT1. This too has proven to be inadequate in providing an audio system for a handsfree terminal which permits full-duplex capability.

SUMMARY OF THE INVENTION

It is therefore an object of the present invention to provide an audio system for a handsfree telephone terminal which results in a virtual full-duplex effect while keeping a sufficiently high perceptual echo return loss. In this description the term "handsfree" refers to a telephone terminal whereby a conversation may be conducted without the handset being coupled directly to the user's ear.

In the present invention the above objective is achieved by introducing a second ERL target, namely, ERLT2, in addition to the first target ERLT1. Again, ERLT1 is large enough to guarantee an acceptably low echo level at the far end under all signal conditions in both receive and transmit directions. Being less than ERLT1, ERLT2 permits the full duplex capability. ERLT1 is applied only when needed. Otherwise, ERLT2 is applied. This concept is based on the fact that the echo only needs to be fully controlled when the far end user of the system is talking and the near end user is quiet. When the far end user is quiet there is no signal to create an echo and when both users are talking the near end user's voice masks the echo.

It is accordingly an object of the present invention to overcome the aforementioned problem by introducing a third variolosser in the transmit path which raises the ERL of the handsfree terminal from ERLT2 to ERLT1 only when the far end user is talking and the near end user is quiet.

Therefore in accordance with a first aspect of the invention there is provided an audio system for a telephone terminal operable in handsfree mode. The audio system comprises a receive path having a receiving transducer and first controllable loss means; a transmit path having a transmitting transducer and a second controllable loss means; detection means in both paths to detect speech activity; processing means responsive to the detection means to selectively control the loss introduced into respective paths; and third controllable loss means in the transmit path controllable by the processing means to introduce additional loss in dependence on speech activity on both receive and transmit paths.

In accordance with a second aspect of the present invention, there is provided an audio system for a telephone terminal operating in hands free mode which permits full duplex functionality. In accordance with the invention the system has a transmit path including a microphone and a transmit variolosser; a receive path including a loudspeaker and a receive variolosser; and an acoustic echo canceller communicatively coupled between the transmit path and the receive path. The system also has a digital signal processor, responsive to a speech activated switch, which determines the instantaneous state of the system and controls the loss introduced by the respective variolossers. The improvement, according to the present invention, comprises a complementary variolosser in the transmit path, the loss introduced thereby being dependent on the instantaneous state of the system.

In a preferred embodiment, the sum of the losses introduced by the receive variolosser and transmit variolosser is a constant value which is required to meet the echo return loss target ERLT2. The complementary variolosser introduces sufficient additional loss to meet the ERL target ERLT1 only when required as determined by the state of the system.

In accordance with a further aspect of the invention there is provided a method of controlling echo return loss in an audio system for a telephone terminal operable in handsfree mode, the system having a receive path with a loudspeaker and first controllable loss means, a transmit path with a microphone and second controllable loss means, a system state detector to determine speech activity on respective paths and processing means responsive to the state detector to control the first and second loss means. The method comprises: controlling the sum of the losses created by the first and second loss means so that the handsfree terminal meets a predetermined echo return loss target ERLT2; selectively introducing a third controllable loss means into the transmit path, the amount of the loss created by the third loss means when added to the sum of the first and second loss means being sufficient to meet another predetermined echo return loss target ERLT1; and controlling the loss introduced by the third loss means in response to detected speech activity whereby either ERLT1 or ERLT2 is met as needed.

BRIEF DESCRIPTION OF THE DRAWINGS

The invention will now be described in greater detail with reference to the attached drawings wherein.

DETAILED DESCRIPTION OF THE INVENTION

Figure 1:
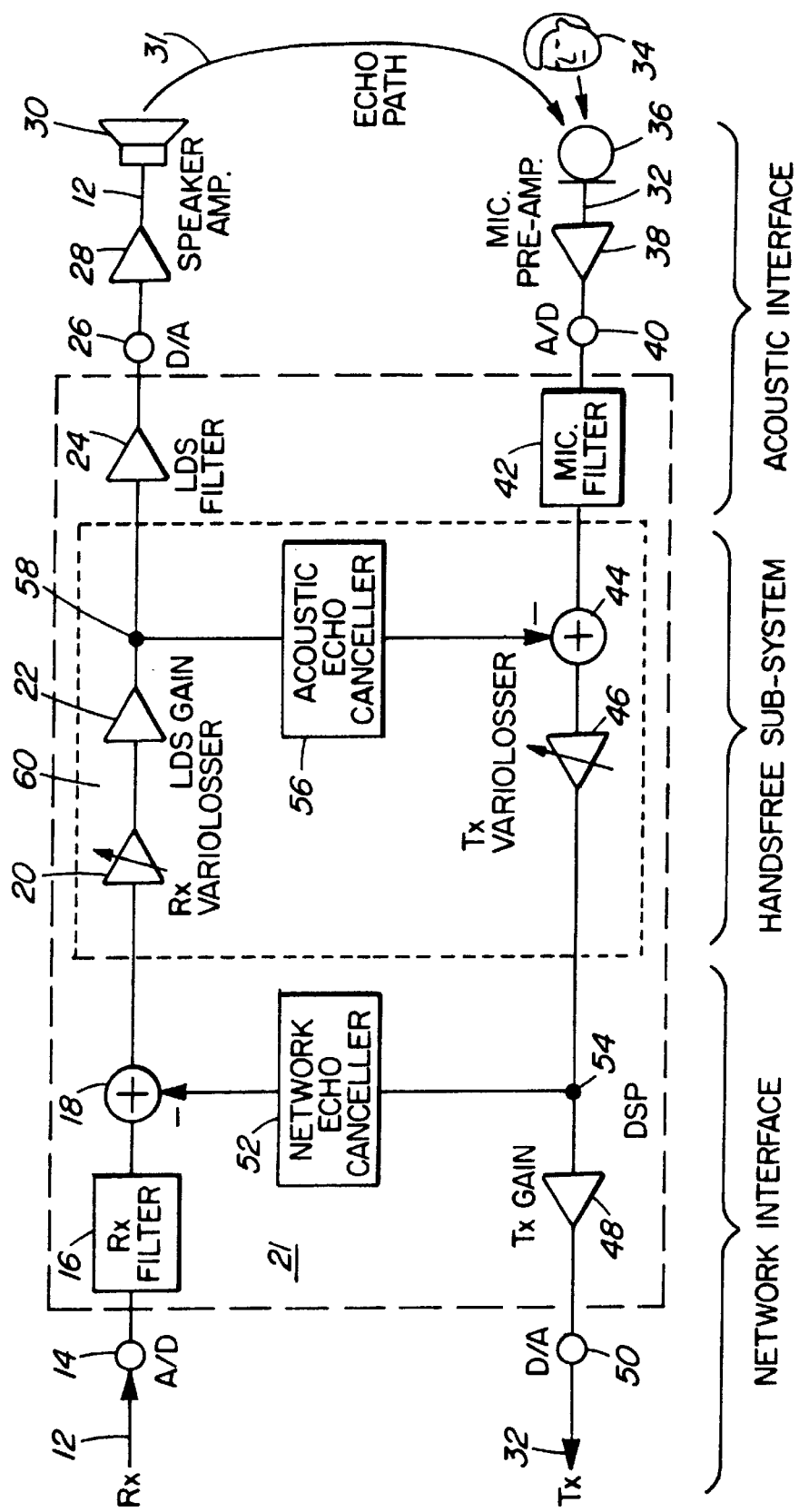
FIG. 1 is a simplified block diagram of an audio system for a hands free terminal with an acoustic echo canceller.

As shown in FIG. 1, the voice paths of the telephone system operable in handsfree mode include a network interface, a handsfree subsystem, and an acoustic interface. Receive path 12 designated Rx originates with a far end user and includes speech activity as is well known. The signal, in analog form, is first converted to digital by A/D converter 14. This digital signal is filtered by filter 16 and passed through to the handsfree subsystem via combiner 18. Within the handsfree subsystem loss is selectively applied to the signal via the receive variolosser 20. The variolosser also includes a speech activated switch which communicates with a digital signal processor (DSP) which in turn controls the amount of loss introduced by variolosser 20. In fact the circuit elements within box 21 are all controlled by the DSP. By way of example, the digital signal processor may be a Motorola DSP 56156. The signal is then amplified by speaker amplifier 22 and filtered by speaker filter 24. The digital signal is then converted to analog by D/A converter 26, amplified by amplifier 28 and converted to an acoustic signal by loudspeaker 30.

The transmit path 32 transmits the speech activity of near end speaker 34 to a far end user (not shown). Within transmit path 32 is microphone 36, microphone pre-amplifier 38, and A/D converter 40. Transmit path 32 also includes microphone filter 42, combiner 44, transmit variolosser 46, transmit amplifier 48 and D/A converter 50. Network echo canceller 52 is coupled between node 54 in transmit path 32 and combiner 18 in receive path 18. Similarly acoustic echo canceller 56 is coupled between node 58 in the receive path and combiner 44 in transmit path 32.

In handsfree mode of operation the audio signal from loudspeaker 30 is broadcast into the acoustic media surrounding near end user 34. A portion of this signal will, naturally, be received by microphone 36 via echo path 31. This is known as the echo signal which, if permitted to reach the far end user, creates an unacceptable effect.

In the system of FIG. 1 as previously indicated, a microprocessor controls the amount of signal attenuation provided by the receiver variolosser 20, transmit variolosser 46, and acoustic echo canceller 56. The sum of the losses provided by the individual elements is sufficient for the handsfree terminal to satisfy the echo return loss target ERLT1. It is to be understood that ERLT1 is the amount of loss necessary to reduce the echo signal on transmit path 32 to a level such that is not annoying to a far end user (not shown) of the system under all signal conditions in both receive and transmit directions. The absolute value of the echo return loss target ERLT1 depends on the particular terminal acoustics and network conditions.

The sum of the losses created by receive variolosser 20 and transmit variolosser 46 is a constant. As the loss created by receive variolosser 20 is increased the loss created by transmit variolosser 46 is decreased by an equal amount. This sum is not sufficient to meet the echo return loss target ERLT1, the balance of the required loss being provided by acoustic echo canceller 56.

As discussed previously, the total loss required to meet the echo return loss target ERLT2 means that if the far end speaker is talking, any input from the near end user will be attenuated to the point of not being detected by the far end user. The same case applies for the opposite situation. Thus, the system shown in FIG. 1 is half-duplex, i.e., any party on the connection cannot hear and be heard at the same time.

Figure 2:
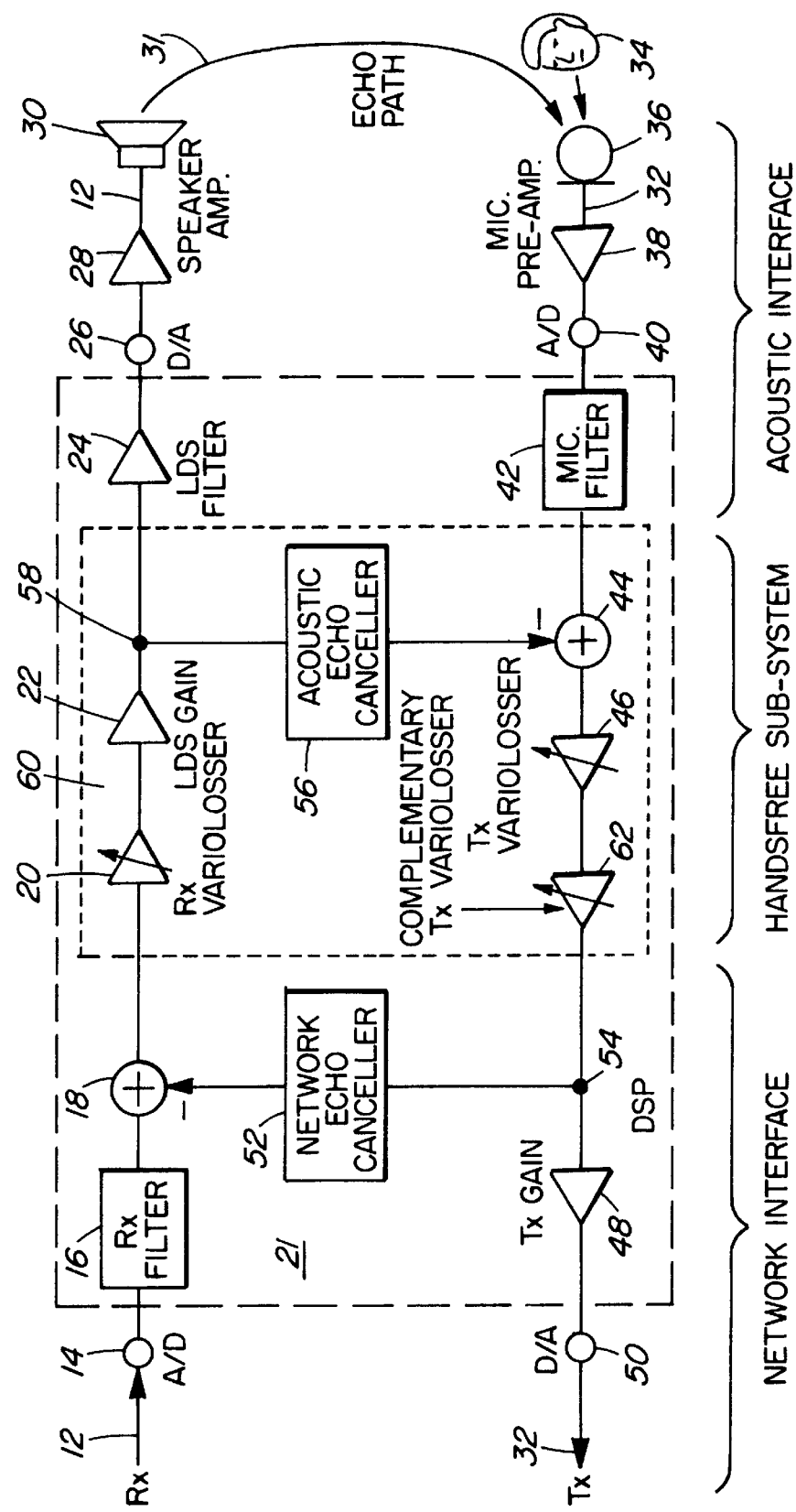
FIG. 2 is a detailed block diagram of the system of FIG. 1, including the complementary variolosser of the present invention.

The improvement according to the present invention is shown in FIG. 2. Elements common with those shown in FIG. 1 have the same reference numerals. As previously discussed, the elements shown within box 21 are controlled by the digital signal processor DSP. The handsfree audio subsystem which provides the improved loss control is shown in inner box 60.

Referring more specifically to handsfree subsystem 60, it will be seen that acoustic echo canceller 56 is communicatively coupled between receive line 12 and transmit line 32. In the preferred embodiment of the invention the loss produced by the combination of the receive variolosser 20, the transmit variolosser 46 and the acoustic echo canceller 56 meets the target ERLT2, but is not sufficient to meet the echo return loss target ERLT1. As in the previous description the sum of losses generated by the receive variolosser 20 and transmit variolosser 46 is a constant. The sum of the aforementioned three losses, however, is just small enough to enable both the far end user and the near end user to hear and be heard at the same time. The loss introduced selectively by the complementary variolosser 62 is sufficient to raise the total loss to the level required to meet the echo return loss target ERLT1.

The concept of the present invention, therefore, is to introduce the loss generated by the complementary variolosser 62 only when needed. For example, when there is no or very little signal in the receive path 12 there will be only a small signal to be echoed back on the transmit path 32 and consequently there is no need to introduce any loss via the complementary variolosser 62. Similarly, when the near end user and the far end user are both talking, the echo that the far end user might hear will be masked by the near end user's voice and hence the echo return loss can be low. It is only when the far end user is talking and the near end user is quiet that the returned echo signal presents a problem. Thus, this is the only condition wherein the loss generated by the complementary variolosser needs to be introduced into the transmit path.

The complementary variolosser 62 is controlled by the digital signal processor in conjunction with the switched means in the variolossers which are responsive to voice signals on both the receive and transmit paths.

The control of the complementary variolosser operates on the following criteria:

(a) it is set to zero when the system is in transmit mode, i.e., the transmit signal is stronger than the receive signal and the loss attributable to the receive variolosser is much greater than the loss created by the transmit variolosser;

(b) ramps up to 10 dB at a rate of 2 dB/60 ms where the system is in quiescent mode, where the transmit and receive signal levels are very close in value and the losses introduced by the receive and transmit variolosser are substantially equal;

(c) ramps up to 10 dB at a rate of 6 dB/4 ms when the system is in receive mode without double talk detected, i.e., the receive signal is much stronger than the transmit signal and the transmit variolosser is much greater than the receive variolosser; and (d) diminishes at a rate of 6 dB/4 ms when the system is in receive mode with double talk detected, i.e., the receive signal is slightly stronger than the transmit signal and the transmit variolosser is much greater than the receive variolosser.

Although a particular embodiment of the invention has been illustrated and described, it will be apparent that various changes can be introduced. The scope of the invention is only limited by the appended claims.

We claim:

1. An audio system for a telephone terminal operable in handsfree mode, the system comprising:

a receive path having a receiving transducer and first controllable loss means;

a transmit path having a transmitting transducer and second controllable loss means;

an acoustic echo canceller operatively connected between said receive path and said transmit path;

detection means in said receive path and said transmit path to detect speech activity on respective paths;

processing means responsive to said detection means to control the loss introduced into said receive and transmit paths; and third controllable loss means in said transmit path controllable by said processing means such that the loss of said third controllable loss means is set to zero when the system is in transmit mode, ramps up to a predetermined maximum at a rate of approximately 2 dB/6.0 ms when the system is in quiescent mode, ramps up to the predetermined maximum at a rate of approximately 6 dB/4 ms when the system is in receive mode without double talk detected, and diminishes at a rate of approximately 6 dB/4 ms when the system is in receive mode with double talk detected, wherein the sum of the losses due to said first controllable loss means, said second controllable loss means and said acoustic echo canceller is sufficient for said handsfree terminal to meet a second echo return loss target (ERLT2), and the additional loss selectively introduced by said third controllable loss means is sufficient for the handsfree terminal to meet a first echo return loss target (ERLT1).

2. An audio system as defined in claim 1, said first, second and third controllable loss means being variolossers.

3. An audio system for a telephone terminal operable in handsfree mode, the system comprising:

a transmit path having a microphone and a transmit variolosser;

a receive path having a loudspeaker and a receive variolosser;

an acoustic echo canceller operatively connected between said receive path and said transmit path;

a digital signal processor responsive to a speech activated switch means to determine the instantaneous state of the system and to control loss introduced by respective variolossers and said acoustic echo canceller, the improvement comprising, a complementary variolosser in said transmit path controllable by said digital signal processor such that the loss of said complementary variolosser is set to zero when the system is in transmit mode, ramps up to a predetermined maximum at a rate of approximately 2 dB/60 ms when the system is in quiescent mode, ramps up to the predetermined maximum at a rate of approximately 6 dB/34 ms when the system is in receive mode without double talk detected, and diminishes at a rate of approximately 6 dB/4 ms when the system is in receive mode with double talk detected, wherein the sum of the losses due to said first and second variolossers and said acoustic echo canceller is sufficient for said handsfree terminal to meet a preselected second echo return loss target (ERLT2), and the additional loss selectively introduced by said complementary variolosser in combination with the loss introduced by said first and second variolossers and said acoustic echo canceller is sufficient for the handsfree terminal to meet a preselected first echo return loss target (ERLT1).

4. An audio system as defined in claim 3 wherein said loss introduced by said complementary variolosser is at the predetermined maximum when there is no speech activity detected on said transmit path and speech activity is detected on said receive path.

5. A method of controlling echo return loss in an audio system for a telephone terminal operable in handsfree mode by a user, the system having a receive path with loudspeaker and first controllable loss means, a transmit path with microphone and second controllable loss means, an acoustic echo canceller operatively connected between said receive path and said transmit path, system state detection means to determine speech activity on said paths and processing means to control said first and second loss means responsive to said state detection means, the method comprising:

controlling the loss created by the acoustic echo canceller and said first and second controllable loss means to a value whereby said handsfree terminal meets a second predetermined echo return loss target (ERLT2);

introducing a third controllable loss means into the transmit path such that the loss of said third loss means is set to zero when the system is in transmit mode, ramps upto a predetermined maximum at a rate of approximately 2 dB/60 ms when the system is in quiescent mode, ramps up to the predetermined maximum at a rate of approximately 6 dB/4 ms when the system is in receive mode without double talk detected, and diminishes at a rate of approximately 6 dB/4 ms when the system is in receive mode with double talk detected, the value of said third loss means when added to the loss created by the acoustic echo canceller and said first and second loss means being sufficient for said terminal to meet a first predetermined echo return loss target (ERLT1); and controlling the loss introduced by said third loss means to be at the predetermined maximum in response to detected speech activity on the receive path when the user of the terminal is silent.

6. An audio system as defined in claim 1 wherein said loss introduced by said third controllable loss means is at the predetermined maximum when the user of the terminal is silent and speech activity is detected on the receive path.

* * * * *